US009600689B2

(12) United States Patent
Neuenschwander et al.

(10) Patent No.: US 9,600,689 B2
(45) Date of Patent: Mar. 21, 2017

(54) VARIABLE ANONYMOUS IDENTIFIER VALUE

(71) Applicant: Apple Inc., Cupertino, CA (US)

(72) Inventors: Erik C. Neuenschwander, San Mateo, CA (US); André M. J. Boulé, San Jose, CA (US); Brendan J. Langoulant, San Francisco, CA (US); David Robert Stites, Santa Clara, CA (US); Tyler Dagan McRae Hawkins, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 13/889,858

(22) Filed: May 8, 2013

(65) Prior Publication Data

US 2014/0215635 A1     Jul. 31, 2014

Related U.S. Application Data

(60) Provisional application No. 61/756,665, filed on Jan. 25, 2013.

(51) Int. Cl.
| | |
|---|---|
| *G06F 7/04* | (2006.01) |
| *G06F 17/30* | (2006.01) |
| *H04N 7/16* | (2011.01) |
| *G06F 21/62* | (2013.01) |
| *H04L 29/06* | (2006.01) |

(52) U.S. Cl.
CPC ...... *G06F 21/6254* (2013.01); *H04L 63/0407* (2013.01)

(58) Field of Classification Search
CPC ............ H04L 63/0407; H04L 63/0421; G06F 21/6254
See application file for complete search history.

(56) References Cited

U.S. PATENT DOCUMENTS

| | | | | |
|---|---|---|---|---|
| 5,790,955 | A * | 8/1998 | Tomoike | 455/453 |
| 8,190,593 | B1 * | 5/2012 | Dean | 707/707 |

(Continued)

FOREIGN PATENT DOCUMENTS

WO     2008/141947     5/2009

OTHER PUBLICATIONS

International Preliminary Report on Patentability from PCT Application No. PCT/US2014/013054 dated Aug. 6, 2015.

(Continued)

*Primary Examiner* — Fatoumata Traore
*Assistant Examiner* — Amie C Lin
(74) *Attorney, Agent, or Firm* — Polsinelli LLP

(57) ABSTRACT

Systems and method for allowing an identifier value associated with a computing device, and that is delivered to content providers when requesting content, to be altered from that of the unique identifier value associated with the computing device. A computing device will include user interface elements that allow a user to request a new identifier on-demand. In some cases, the user can also configure the computing device to obtain a new identifier value in response to other actions at the computing device or automatically when some type of usage criteria is met. The identifier value is configured to be substantially unique and to be different than a unique identifier associated with the computing device to provide anonymity for the user.

22 Claims, 9 Drawing Sheets

(56) References Cited

U.S. PATENT DOCUMENTS

| | | | | |
|---|---|---|---|---|
| 8,619,194 | B1* | 12/2013 | Franji | 348/553 |
| 2004/0224664 | A1* | 11/2004 | Guo | H04L 29/12783 |
| | | | | 455/411 |
| 2005/0287990 | A1 | 12/2005 | Mononen et al. | |
| 2011/0099392 | A1* | 4/2011 | Conway | 713/300 |
| 2011/0154473 | A1* | 6/2011 | Anderson et al. | 726/11 |
| 2012/0254949 | A1* | 10/2012 | Mikkonen et al. | 726/4 |

OTHER PUBLICATIONS

International Search Report and Written Opinion from PCT Application No. PCT/US2014/013054 dated Apr. 10, 2014.

\* cited by examiner

VARIABLE ANONYMOUS IDENTIFIER VALUE

CROSS-REFERENCE TO RELATED APPLICATIONS

The application claims the benefit of U.S. Provisional Patent Application No. 61/756,665, entitled "VARIABLE ANONYMOUS IDENTIFIER VALUE", filed on Jan. 25, 2013, and which is hereby expressly incorporated herein by reference in its entirety.

BACKGROUND

Technical Field

The present technology relates generally to user privacy in a network-based ecosystem and more specifically systems and methods for using and varying an identifier value of a computing device associated with the user with respect to one or more entities in the network-based ecosystem.

Introduction

Online commerce is quickly becoming a ubiquitous part of the modern economy and there are many options for finding and buying goods and services online. Along the lines of this growth have been increased concerns for privacy and online anonymity. Like the more traditional markets, the online retail market benefits greatly from invitational content. Moreover, a much greater benefit is derived in an invitational media campaign when invitational content can be targeted to certain users who are more likely to be interested in the invitational content. Therefore, it is beneficial to pass some information about users to an invitational content provider in order allow the invitational content provider to target users. However, the practice of providing personal data that can serve to identify particular users apart from their simple demographic attributes is oftentimes socially, politically, and possibly legally unacceptable.

Some types of content requests are associated with an identifier value associated with a client device. In some cases, these identifier values are provided, along with other information, to invitational content providers. Further, this type of identifier value may also be used by third party developers to track the users of their software. Therefore, in a robust distribution system having many partners and having users who are very active in the ecosystem, the users' data may be widely spread out through the whole system. However, even though the data may be widely spread, as the amount of transactions grow, the amount of personal data that is associated with the identifier value can also grow to a point where it is conceivable that a third party could piece together the small amounts of personal data using the identifier value and compile a relatively complete picture of who the user might be.

Accordingly, the present technology addresses the need for allowing user to remain relatively anonymous by allowing users to manipulate an identifier value associated with the user's device.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by practice of the principles set forth herein.

The present technology is directed to systems methods that to allow a user to change, on-demand or on a scheduled basis, the identifier values associated with a computing device and shared with various content providers. In some embodiments, the computing device will be configured to include a user interface allows a user to request a new identifier whenever they wish to do so. In some cases, the user interface can include elements to confirm the user's decision. Alternatively, the user can also configure the computing device to automatically obtain a new identifier in response to performing other privacy actions at the computing device or in response to a usage of the identifier value meeting some criteria.

In the present technology, each time a new identifier value is needed, the client device can obtain a new identifier value and store such an identifier value for future use. In the various embodiments, this identifier value is configured to be substantially unique and to be different than a unique identifier associated with the computing device. Thereafter, whenever a content request is made to a content provider, the content request can utilize the new identifier value to uniquely identify the device. Additionally, the user, on demand, can cause the process to be repeated to cause the computing device to be associated with a new, different identifier than the one selected before.

BRIEF DESCRIPTION OF THE DRAWINGS

In order to describe the manner in which the above recited and other advantages and features of the disclosure can be obtained, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the present technology are discussed in detail below. While specific implementations are discussed, it should be understood that this is done for illustration purposes only. A person skilled in the relevant art will recognize that other components and configurations may be used without parting from the spirit and scope of the present technology described by the disclosure.

The present technology addresses the need for allowing users in interact with at least some types of content providers in a more anonymous fashion by allowing a user to control a client device such that it is not necessary for the client device to be perpetually associated with a single identifier value. As a result, a user, via one client device, can interact with such content providers on a more anonymous basis by periodically changing the identifier value associated with the client device. In the various embodiments, this can be performed on-demand, on a scheduled basis, automatically, or according to any other scheme. As a result of this process, content providers are prevented from accumulating large amounts of information regarding a user associated with a client device, since the user at the client device will have the opportunity to communicate with the content provider with more than one identifier values. As a result, the content provider is likely to interpret requests from a single client device as requests being received from multiple users, further increasing the anonymity of the user.

Although the various embodiments will be described with respect to the general concept of withholding actual identifier values from applications and the like, the present disclosure contemplates that such withholding is not necessarily absolute. For example, an actual identifier value of a client device may be withheld for certain application or certain functions of an application, but may still be utilized for other functions. In particular, for purposes of tracking or identification, the anonymous identifier value may be used, while for debugging or other functions, the actual identifier value may be used. The use of identifier values in accordance with the various embodiments of the present technology can be specified a priori or by the user at the client device.

Figure 1:
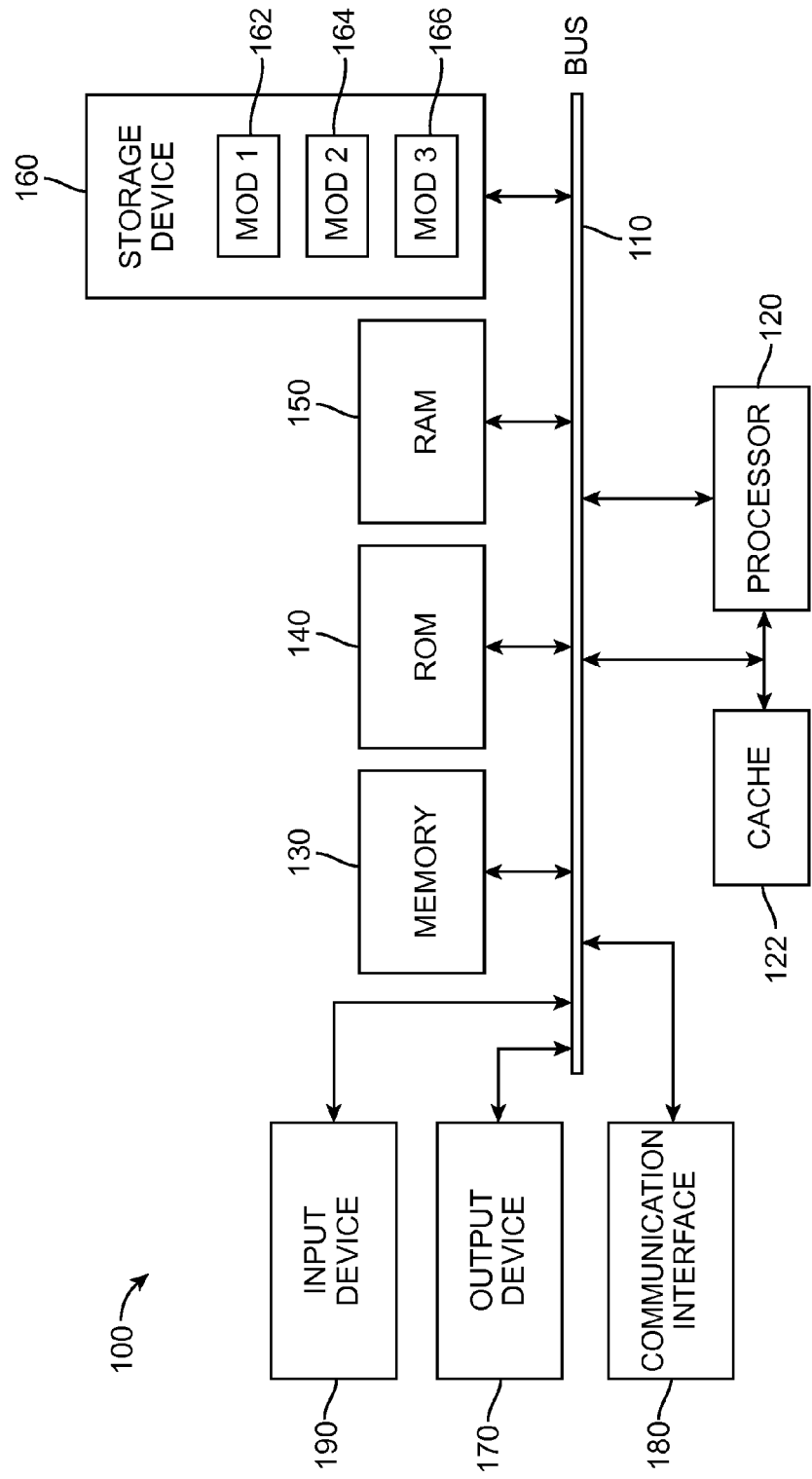
FIG. 1 illustrates an exemplary computer system according to some embodiments of the present technology.

Various embodiments of the present technology are carried out using one or more computing devices. With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of the one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166, which are modules configured to control the processor 120. These modules may be stored on the storage device 160 and loaded into RAM 150 or memory 130 at runtime or may be stored as would be known in the art in other computer-readable memory locations.

Figure 2:
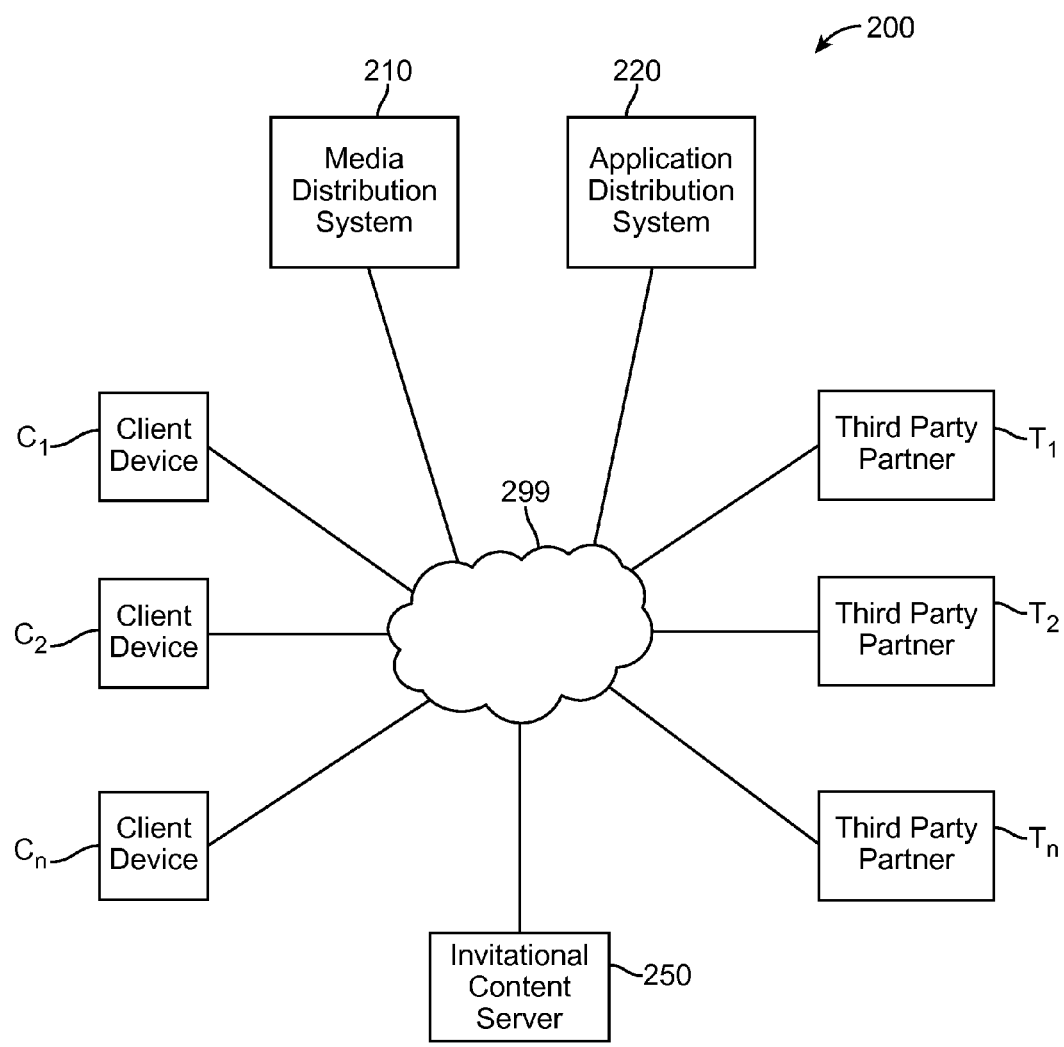
FIG. 2 illustrates an exemplary network infrastructure according to some embodiments of the present technology.

The present technology is carried out in a network-based ecosystem in which pluralities of computing devices communicate with each other via one or more networks. Such computing devices include, but are not limited to, personal computers, smartphone devices, tablet devices, server computers, network storage devices, network routing devices, or any other type of network-connectable computing device. FIG. 2 illustrates an exemplary network infrastructure 200 according to some embodiments of the present technology.

According to FIG. 2, the network infrastructure 200 comprises a plurality of client devices C1, C2, . . . , Cn operatively coupled with a media distribution system 210, an application distribution system 220, or both via one or more networks 299. The client devices C1, C2, Cn can include personal computer devices, smartphone devices, tablet devices, set-top box devices, smart television devices, netbook devices, or any other types of computing devices associated with users and requesting content from other computing devices.

In some embodiments of the present technology, the media distribution system 210 and the application distribution system 220 allow users to create accounts for storing profile information, contact information, billing information, media items, taste data, etc. In some embodiments of the present technology, the media distribution system 210 comprises an online store for selling or otherwise providing media items such as iTunes®, available from Apple Inc. of Cupertino, Calif. In some embodiments of the present technology, the application distribution system 220 comprises an online store for selling or otherwise providing software applications items such as the AppStore$^{SM}$, available from Apple Inc. of Cupertino, Calif.

The media distribution system 210 and the application distribution system 220 are also operatively coupled with third party partners T1, T2, . . . , Tn. The third party partners T1, T2, . . . , Tn provide media and software applications and services in addition to or in connection with the services provided by the media distribution system 210 and the application distribution system 220.

Additionally, the plurality of client devices C1, C2, . . . , Cn are operatively coupled with an invitational content server 250. The invitational content server 250 is configured to target, package, and deliver invitational content to users. The invitational content server 250 can target invitational content to users based on several types of information. These include, but are not limited to, behavioral information, geographic information, and demographic information relating to the users associated with the client devices C1, C2, . . . , Cn.

As described herein, one aspect of the present technology is to address improper gathering and use of data available from various sources. The present disclosure contemplates that, in some instances, this gathered data might include personal information data that uniquely identifies or can be used to contact or locate a specific person. Such personal information data can include demographic data, location-based data, telephone numbers, email addresses, twitter ID's, home addresses, or any other identifying information. In some cases, such information may be used to improve the delivery of invitational content including, promotions, advertisements, or any other content that may be of interest to users. However, the present disclosure contemplates that in some circumstances, such information may be used for more nefarious purposes, such as theft of identity or illicit tracking of particular individual's activities, location, or the like.

Of particular concern are non-trusted content providers, such as some of third party partners T1, T2, . . . , Tn or invitational content server 250 with which the user may not have a trusted relationship. In the case of trusted providers, such as media distribution system 210 and the application distribution system 220, gathering of such information may be less of a concern, as such providers typically have established procedures for preventing the abusive use of such personal information, as discussed below. Further, the sharing of such information with such providers may be necessary for the proper operation of the client devices C1, C2, . . . Cn.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

As explained above, in some online ecosystems, a system operator could conceivably piece together the small amounts of personal data dispersed throughout a system to compile a relatively complete picture of who the user might be. Accordingly, some embodiments of the present technology involve managing the information shared with system partners by managing the use of unique identifier values to prevent system partners from collecting and piecing information to identify the user of a device or even to make an educated guess about the identity of the user.

Figure 3:
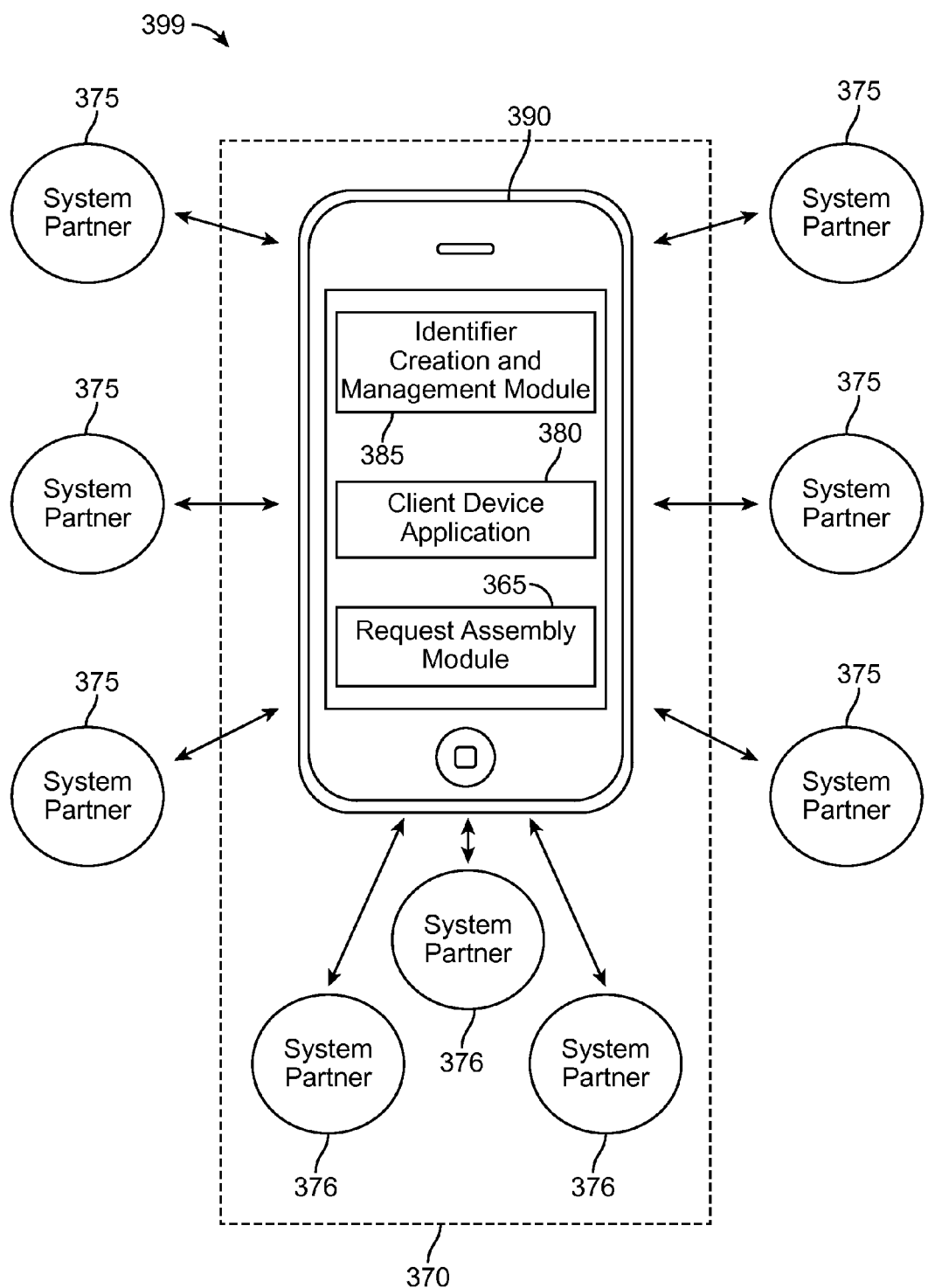
FIG. 3 illustrates an exemplary system for device-based information management in an ecosystem having a plurality of system partners according to some embodiments of the present technology.

FIG. 3 illustrates an exemplary system 399 for device-based information management in an ecosystem having a plurality of system partners 375 and 376 according to some embodiments of the present technology. As previously described with respect to FIG. 2, a client device 390 is operatively coupled, through one or more networks, to the plurality of system partners 375 and 376. System partners 375 and 376 can comprise a number of different entities including online service providers, software applications, preinstalled device programs, software add-ons, media content distribution servers, application distribution servers, etc.

As shown in FIG. 3, the client device 390 includes at least one client device application 380, an identifier value creation and management module 385, and a request assembly module 365. The identifier value creation and management module 385 is configured for generating unique identifier values for the client device 390 and managing interactions with the system partners 375 and 376. Additionally, the identifier value creation and management module 385 can be configured for monitoring requests for obtaining such unique identifier values. The request assembly module 365 is configured, upon a request for content from client device application 380 for content from one of system partners 375, 376, to retrieve an appropriate identifier value from the identifier value creation and management module 385 and cause the request for content to be delivered to the appropriate system partner using the retrieved identifier value.

As noted above, a client device 399 may interact with system partners that are trusted (376) or non-trusted (375). Thus, the request assembly module 365 of client device 390 can be configured to define a trusted zone 370 indicating which identifier values to utilize with each of system partners 375 and 376. The determination of which a specific partner falls within trusted zone 370 (system partners 376) or outside trusted zone 370 (system partners 375) can be made by a user at the client device 390 on-demand or can be defined a priori at the client device 390. In such arrangements, a variable, on-demand, anonymous identifier value may be used for system partners 375 and the pre-defined identifier value associated with the client device 390 may be used for system partners 376. Alternatively, anonymous identifier values can be provided for at least some of the trusted system partners. In such cases, different controls can be provided at the client device 390 to separately adjust these anonymous identifier values. In configurations where the user at the client device 390 specifies that identifier values be adjusted periodically, as further described below, the frequency of adjustments can be based on whether or not a system partner falls within the trusted zone. Additionally, the client device 390 can be configured for categorizing a system partner as trusted or non-trusted on demand. In such a configuration, the request assembly module 365 can be configured to keep track of such a categorization and enforce the use of appropriate identifier values when requests for content are being forwarded to system partners.

In some embodiments, the request assembly module 365 (or at least similar request assembly logic) can be incorporated into a client device application 380. However, in various types of applications, the time at which identifier values and other information regarding the client device can vary. For example, some applications may have request assembly logic that is configured to retrieve any necessary identifier values any time a request for content is being assembled. In this case, the application will always have access to the newest identifier value available. Other applications may have request assembly logic that is configured to retrieve any necessary identifier values on a periodic or scheduled basis. In this case, the identifier value may be stale for a short while. Still other applications may have request assembly logic that is configured to retrieve any necessary identifier values upon startup of the application and this identifier value persists until the application is shut down and restarted. Thus, the stale identifier value would remain in use until the application is restarted. One method of handling stale identifier values is for the user to manually shut down applications either before or after the identifier value is altered. Thus, when the application is restarted, the current identifier value is utilized. However, the present disclosure also contemplates that the identifier value creation and management module 385 could include logic to automate this process. For example, upon obtaining a new identifier value, the identifier value creation and management module 385 could be configured to shut down and restart any currently running applications.

Although FIG. 3 describes that an actual identifier value of client device 390 may be withheld from system partners 375 outside the trusted zone 370, the various embodiments are not limited in this regard. As noted above, it may not be necessary to withhold the identifier value for certain types of operations. Thus, even system partners 375 outside the trusted zone 370 can receive an actual identifier value of the client device 390 under particular circumstances. In particular, certain types of operations or tasks may require an actual identifier value in order for such an operation to be performed, such as debugging, identity verification, sales of protected content, and other operations that require authentication of the client device or a consistent management of actions at the client device.

Figure 4:
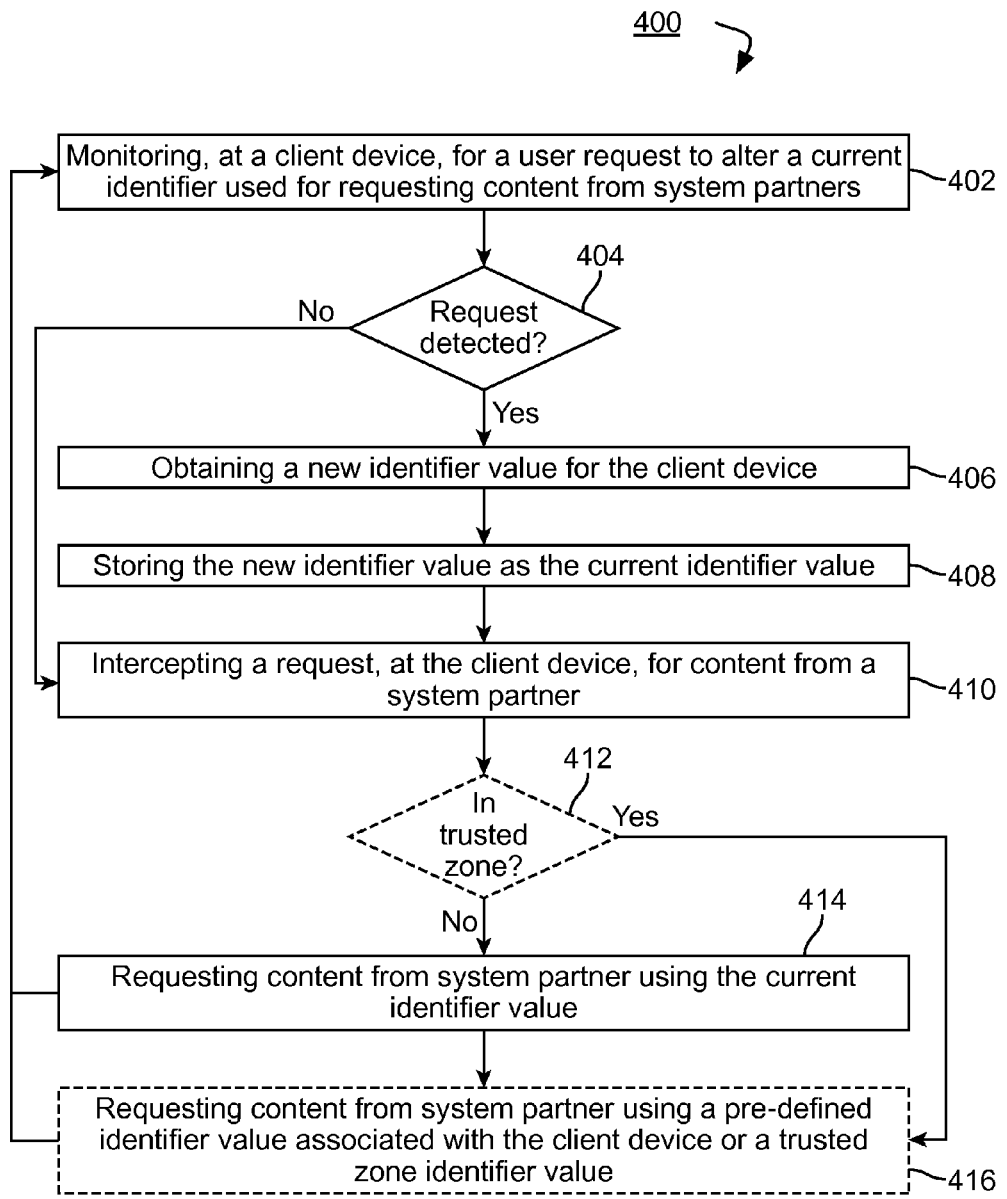
FIG. 4 illustrates a flow chart of steps in an exemplary method for requesting content at a client device using anonymous identifier values in accordance with an embodiment of the present technology.

FIG. 4 illustrates an exemplary method 400 for requesting content at a client device using anonymous identifier values in accordance with an embodiment of the present technology. For ease of illustration, reference will be made, as needed, to elements of FIG. 3. According to FIG. 4, a client device is described as interacting with a generic system partner; however, it will be readily apparent to those with ordinary skill in the art having the benefit of this disclosure that the method described in FIG. 4 is equally applicable for interactions with a wide variety of system partners including, for example, application distribution systems, media distribution systems, and invitational content servers.

Method 400 begins at step 402, with the monitoring for a user request at the client device to alter a current identifier value being used for at least one of the system partners in the ecosystem. Such monitoring can be performed, for example, by identifier value creation and management module 385 of client device 390. In the present technology, the request can be expressly provided or can be provided as a result of other user actions at a computing device. These methods for creating requests are described below with respect to FIGS. 5, 6A, 6B, and 7.

At step 404, once a request is detected, the method 400 continues to step 406. At step 406, a new identifier value for the computing device is obtained. In some embodiments, the new identifier value is obtained via a generation or computation process at the client device. That is, after the identifier value creation and management module 385 detects the request, the identifier value creation and management module 385 can proceed to cause a computation of a new identifier value to occur. This computation can occur inside or outside of identifier value creation and management module 385. For example, in some embodiments, a subroutine can be called to compute the new identifier value, via an application programming interface (API) or other interface at the client device.

As noted above, the new identifier value is intended to be unique. Thus, any methods for creating substantially or practically unique identifier values can be used in the various embodiments. In one specific example, the new identifier value can be a random 128-bit number selected via a method that provides a universally unique identifier value. However, the various embodiments are not limited in this regard and any other computation methods or sizes can be utilized with the present technology. However, as the size of the identifier value is reduced, there is an increased likelihood that the identifier value will not be unique.

In some embodiments, the identifier values can be pre-defined. That is, a client device can be configured to store a pre-defined list of identifier values. Thus, when a request for a new identifier value is received, a value can be selected from this list. The list can be generated a priori using the same types of computation methods described above.

Additionally, although the description above contemplates that new identifier values will be obtained from locations within a client device, the various embodiments are not limited in this regard. That is, the values can be generated and stored at another computing device in communication with client device 390. Thus, the client device 390 can retrieve new identifier values from remote locations as needed. In some cases, this new identifier value can be utilized as a shared secret. That is, in some embodiments, the new identifier value can be obtained from a trusted entity. In this configuration, the user will be able alter the identifier value on demand, but since the identifier is known to the trusted entity, the identifier provides identifying information to the trusted entity while providing an anonymous identifier to other entities.

Once the new identifier value is obtained at step 406, the new identifier value can be stored as the current identifier value at step 408. In some embodiments, the current identifier value is overwritten with the new identifier value. In other embodiments, the current identifier value is saved and concurrently stored with the new identifier value. In such embodiments, the old identifier value can be stored in case the user needs to revert to the old identifier value for any reason. For example, the user may simply wish to use a new value temporarily and revert back to the old value after a period of time has passed or some event has occurred. A specific example would be the enabling of a private mode during which the user simply wishes to interact temporarily using a different identifier value. However, the various embodiments are not limited in this regard and the present technology can be used with other type of scenarios in which a temporary new identifier value is needed.

As noted above, a different identifier value may be desirable for system partners 376 in a trusted zone than those outside the zone, partners 375. Thus, in some embodiments, step 408 can include querying the user as to which zone the new identifier value should be applied to. In other embodiments, the initial identifier value may be identical for all system partners 375 and 376. Thereafter, when a request is received, the new identifier value is applied solely to requests to system partners 375 outside zone 370. In such cases, preserving of the current identifier value is useful to allow it to be saved and used for system partners 376 in trusted zone 370.

Once the new identifier value is stored as the current identifier value at step 408 or a request for content is received prior to a request to alter an identifier value is received (at steps 402 and 404), requests can be managed at steps 410-416. At step 410, the request assembly module 365 can intercept a request for content from one of the system partners and a determination of whether the system partner is in a trusted zone can be made. At step 412, if the system partner is not in the trusted zone, the method proceeds to step 414, else the method 400 proceeds to step 416. At step 414, where the system partner is not in the trusted zone (i.e., one of system partners 375 outside zone 370), the request assembly module 365 can assemble the request for the one of system partners 375 using the current identifier value. If steps 406 and 408 have been performed, this current identifier value is the new identifier value. If the system partner is in the trusted zone (i.e., one of system partners 376 in zone 370), the method proceeds to step 416 where the request assembly module 365 can assemble the request for the one of system partners 376 using a pre-defined identifier value associated with the client device or the identifier value otherwise associated with the trusted zone 370. Thereafter, the method 400 can resume previous processing, including the repeating of steps 402-416.

Although method 400 is described with respect to two zones, trusted and non-trusted, the various embodiments are not limited in this regard. In some embodiments, the identifier value can be the same for all system partners. Thus, steps 412 and 416 are optional and the method 400 can simply proceed from step 410 to step 414. In other words, a determination of whether or not the system partner is in a trusted zone is optional in some embodiments. Further, the present disclosure contemplates that the present technology can be utilized with any number of zones. Thus, method 400 can be modified as needed to account for such additional zones.

As noted above, method 400 begins the process of altering an identifier value based on the detection of a user request for such an alteration. This process is described in greater detail with respect to FIGS. 5, 6A, 6B, and 7.

Figure 5:
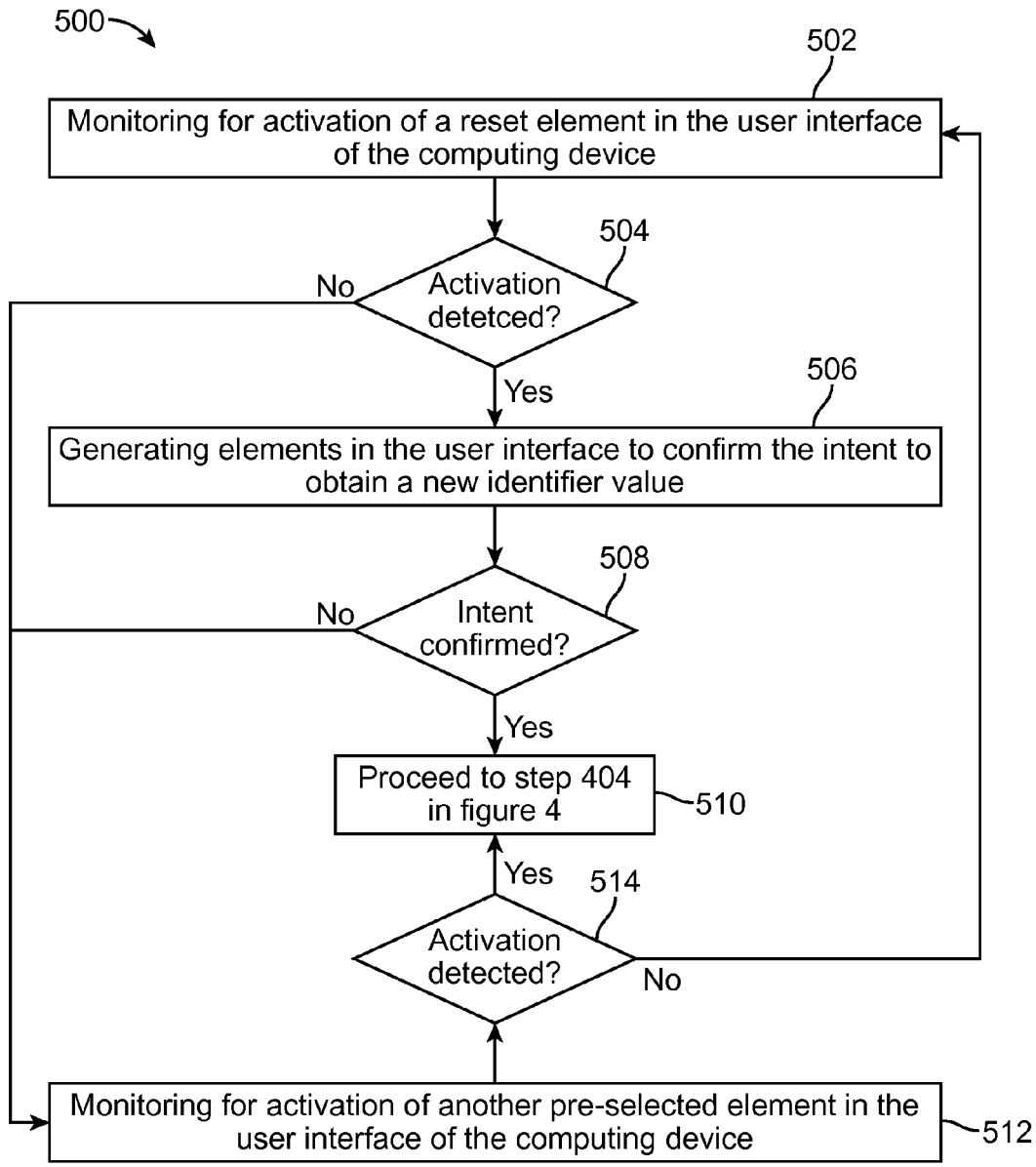
FIG. 5 illustrates a flow chart of steps in an exemplary method for detecting a user request for an alteration of an identifier value.

Turning first to FIG. 5, there is shown a flow chart of steps in an exemplary method 500 for detecting a user request for an alteration of an identifier value. The method 500 begins at step 502 by monitoring for an activation of a reset element in the user interface of the client device. An exemplary user interface for providing such a reset element is show in FIG. 6A.

Figure 6A:
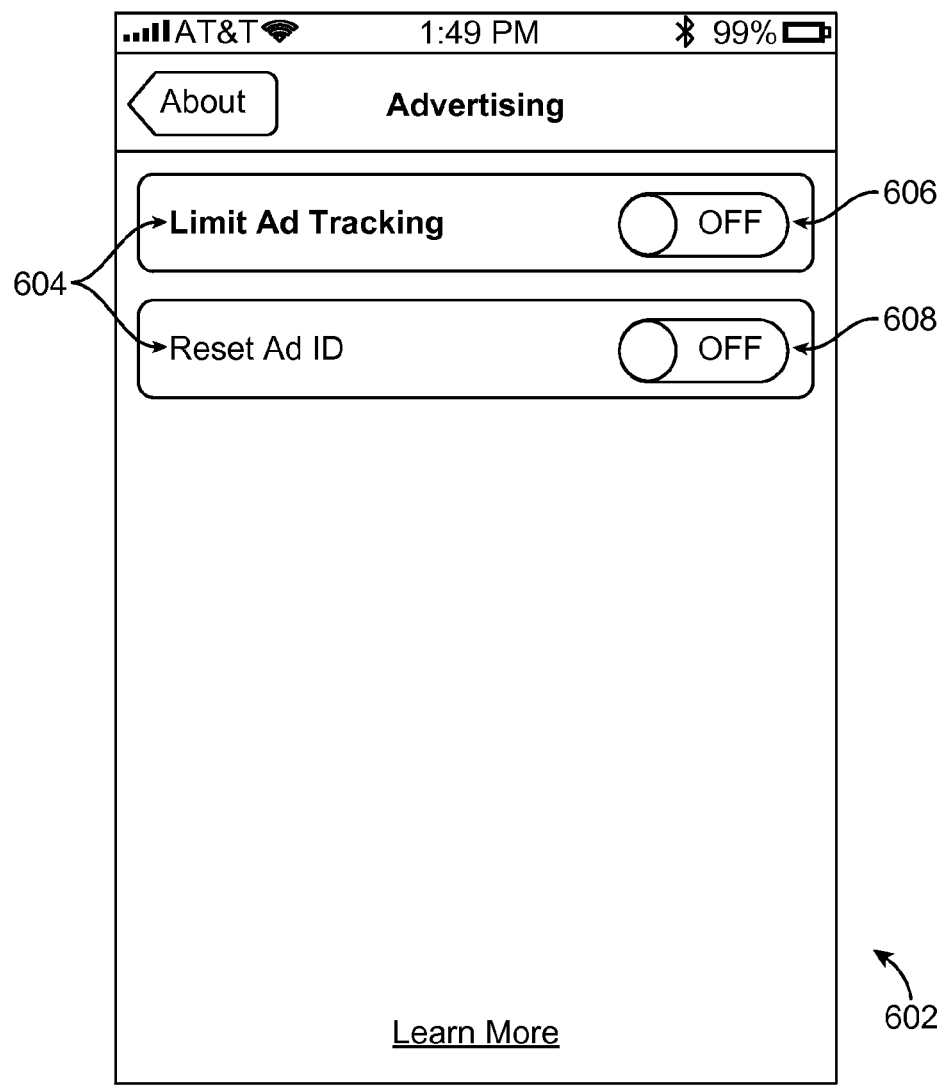
FIGS. 6A and 6B illustrates an exemplary user interface providing elements for altering an identifier value associated with a client device in accordance with some embodiments of the present technology.

As shown in FIG. 6A, a user interface 602 can include or more control elements 604. In particular, FIG. 6A illustrates the user interface including a "Limit Ad Tracking" element 606 and a "Reset Ad ID" element 608. The term "Ad ID" as used herein, refers to an identifier value utilized by content provider to record interactions while a client device is requesting content from a content provider, such as a system partner. The elements 606 and 608 are each configured as descriptor and a soft switch that can be toggled. However, the various embodiments are not limited in this regard and any type of selection element can be used in place of the soft switch, including a regular button, a drop-down list, a check box, a radio button, and a cycle button, to name a few. Additionally, the layout of the user interface 602 and any elements illustrated therein is not limited to that shown in FIG. 6A and can vary according to the client device configuration. For example, in one embodiment, a button in combination with the description "Reset Advertising Identifier" can be used in place of the descriptor and switch shown in FIGS. 6A and 6B.

If the monitoring at step 502 detects that a request has been generated at step 504, such as by a user activation of element 608, the method 500 can proceed to optional steps 506 and 508. Otherwise, the method 500 proceeds to step 512, as described below. First, at step 506, additional elements can be generated in a user interface to confirm the intent of the user to obtain a new identifier value. This is illustrated with respect to FIG. 6B.

Figure 6B:
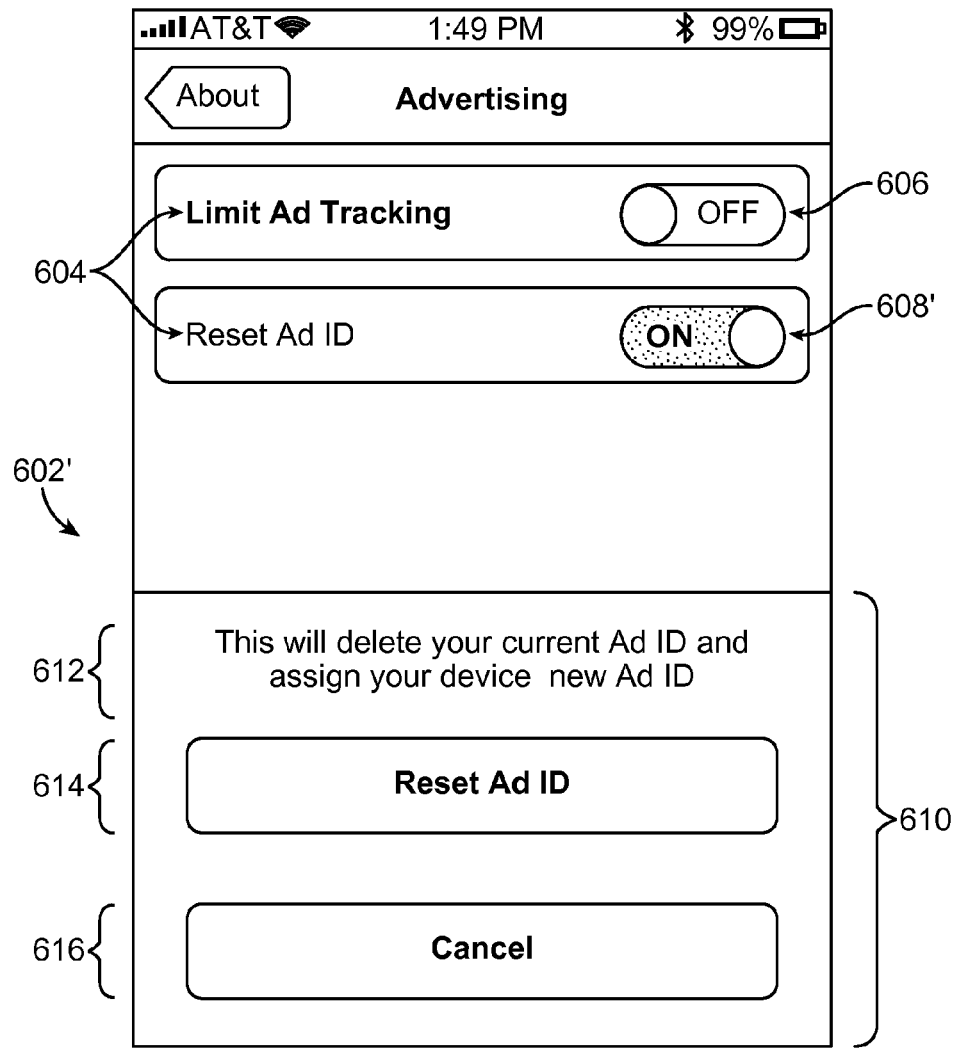

FIG. 6B shows the resulting user interface 602' after the activation of the soft switch in element 608 to yield element 608'. That is, the soft switch in element 608 is toggled from an "off" state to an "on" state, as shown in element 608'. In addition to altering element 608 to yield element 608', the user interface 602' is configured to also include confirmation elements 610. These confirmation elements 610 can include a notification element 612 for indicating to the user information regarding the action about to be taken. Optionally, the notification element 612 can provide a warning to the user regarding the potential effect of altering the current identifier value. The confirmation elements 610 can also include an approval element 614 and a cancellation element 616. As shown in FIG. 6B, the approval element 614 is configured as a regular button element with the descriptor "Reset Ad ID" to approve or confirm the intent to alter the identifier value and the cancellation element 616 is configured as a regular button element with the descriptor "Cancel" to cancel the request. As noted above with respect to interface 602, this configuration of interface 602' is presented solely for illustrative purposes and can vary in the various embodiments.

After the additional elements are generated at step 506, the method 500 can wait for the intent to be confirmed or denied at step 508. If the intent is confirmed at step 508 (i.e., approval element 614 is activated), the method 500 can proceed to step 404 in FIG. 4 and the remainder of method 400 can be performed. In contrast, if the intent is denied (i.e., cancellation element 616 is activated), the method can proceed to step 512. In either case, the configuration of element 608' in user interface 602' can revert to the configuration of element 608 shown in FIG. 6A. That is, the soft switch in element 608' reverts from the "on" position to an "off" position so that it can reactivated at a later time.

As noted above, in the event activation is not detected at step 504 or the intent is not confirmed at step 508, the method can proceed to step 512. At step 512, a monitoring of other interface elements that include a task or step of altering the identifier value can be performed. For example, upon the initializing of one or more types of reset tasks on a client device, the computing device can also be configured to alter the identifier value for the client device. Further, the activating or deactivating of certain features can also cause the client device to alter the identifier value for the computing device. For example, referring back to FIG. 6A, the activation of the soft switch in element 606 can also be configured to cause the identifier value to be altered as part of its overall processes. Therefore, the client device can be configured such that the activation of a feature causes the alteration, the deactivation of the feature causes the alteration, or both. For example, activation, deactivation, or both, of component 606 ("Limit Ad Tracking") in FIG. 6A can cause the identifier value to be altered.

Referring back to FIG. 5, if an activation (or deactivation) of an interface element associated with a altering of the identifier value is detected, the method can proceed to step 510 and to step 404 in FIG. 4. Otherwise, the method can proceed to step 502 and repeat method 500. It should be noted that the present disclosure contemplates that the steps of method 500 can be performed concurrently or serially. For example, steps 502-508 can be performed concurrently with steps 512-514.

As previously noted, in some embodiments, the alteration of the identifier value can be performed on a scheduled basis or automatically based on some criteria. Accordingly, rather than monitoring for a user action to provide the activation, the client device can monitor for the client device itself to provide the activation, based on the schedule or some other criteria, such as usage of the identifier value. In such embodiments, a user interface similar to that of FIGS. 6A and 6B can be provided to allow the user to establish the schedule or conditions and thereafter confirm using such a schedule or conditions to alter the identifier value.

Figure 7:
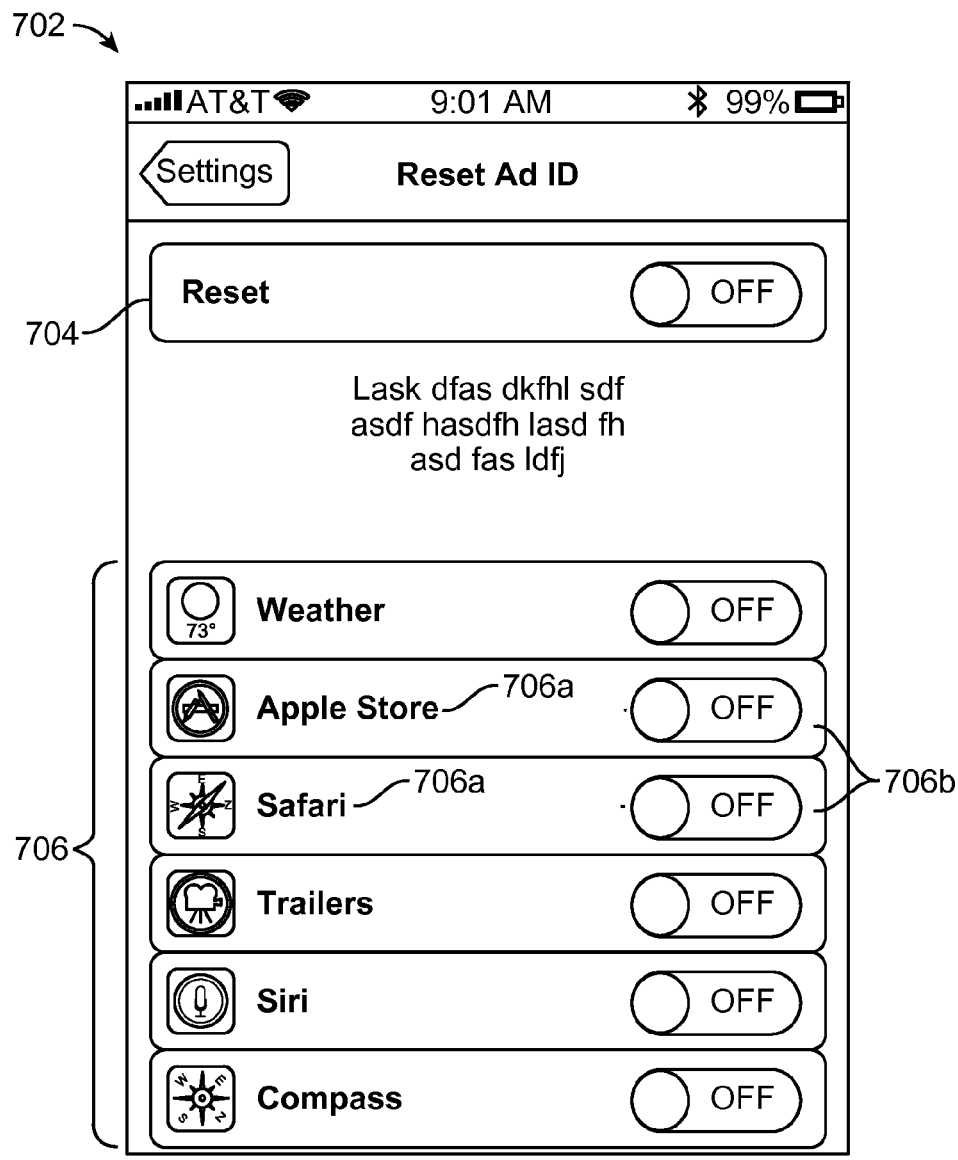
FIG. 7 illustrates an exemplary user interface providing elements for altering an identifier value associated with a client device, on an application by application basis, in accordance with some embodiments of the present technology.

As noted above, the present disclosure contemplates that the identifier value can be adjusted on a partner-by-partner basis. This is illustrated with respect to FIG. 7. FIG. 7 shows an exemplary user interface 702. The user interface 702 can include a control element 704 for altering the identifier value for all system partners, or at least those partners outside a trusted zone. The operation of this control element can be substantially similar to that illustrated with respect to FIGS. 6A and 6B.

In addition to control element 704, the user interface 702 can also include one or more application-specific control elements 706. Each of control elements 706 can be associated with an application on the client device that utilizes the identifier value in some aspect. Thus, each of control elements 706 can include a descriptor 706a and a selection element 706b. As noted above with respect to FIGS. 6A and 6B, the selection element 706b can be configured in a variety of ways. In operation, the user accesses user interface 702 and activates the selection element 706b for a particular application of interest. This process can be carried out in substantially a similar manner as described with respect to FIGS. 6A and 6B.

In the various embodiments, the identifier value obtained for a specific application can be obtained in a variety of ways. In some embodiments, a unique identifier value can be selected for each application. For example, a single identifier value can be initially applied to all applications. Thereafter, as each of selection element 706b is activated, a new, unique identifier value is obtained for the associated application. Accordingly, if all of selection elements 706b are activated, each application listed could be a different identifier value. In other embodiments, the new identifier value can be staged. That is, a single identifier value can be initially applied to all applications. When the first of selection elements 706b is activated, a new, unique identifier value is obtained for the associated application. When another of selection element 706b is selected, the same identifier value is applied. Accordingly, as all of selection elements 706b are activated, each application listed progressively transitions to the new, different identifier value. If a same selection element 706b is reselected, another new identifier value can be obtained. In some cases, the applications can progress to this value. In other case, the application can progress through all the identifier values in order.

In some embodiments, the user interface 702 can be configured to provide additional notifications to the user regarding use of an identifier value by an application. For example, a usage indicia can be provided for applications. In particular, the presentation of the usage indicia can be configured so that when usage of an identifier value meets a certain criteria the user is notified that the usage of an identifier has met the certain criteria. For example, such criteria can include an age of the identifier value, the number of times the identifier has been used (on an overall or per-application basis), the frequency at which the identifier value has been used (on an overall or per-application basis), or some combination thereof (on an overall or per-application basis). In some embodiments, different versions or forms of the usage indicia can be provided for different levels of usage. It should be noted that although the usage level can be a simple measure of usage in some embodiments, in other embodiments the usage level can be based on a formula that translates counts, times, frequency, other measures of usage, or any combinations thereof into a usage level.

However, it should be noted that in embodiments described above, changes to other components of a client device might be needed. For example, in the case of client device 390, it is necessary to configure the identifier value and creation module 385 and the request assembly module 365 to keep track of and manage the use of potentially a different identifier value for each application on the client device. Further, such elements can be configured to track usage of identifier values in order to generate the usage indicia 706c.

In some embodiments, the notifications can be more explicit. That is, upon the meeting of some criteria, alternatively or in combination with the generation of indicia as shown in FIG. 7, a message or other type of notification can be provided to the user. For example, an email, text, or voice message can be provided to the user to notify the user regarding the excessive usage of the identifier value.

The present disclosure contemplate that there may be circumstances in which a single application at client device may need to engage in a transaction that involves system partners of an ecosystem in which some partners are within the trusted zone and other partner fall outside of the trusted zone. In such cases, a client device will need to be configured to manage multiple identifier values for the single application. This is illustrated below with respect to FIG. 8.

Figure 8:
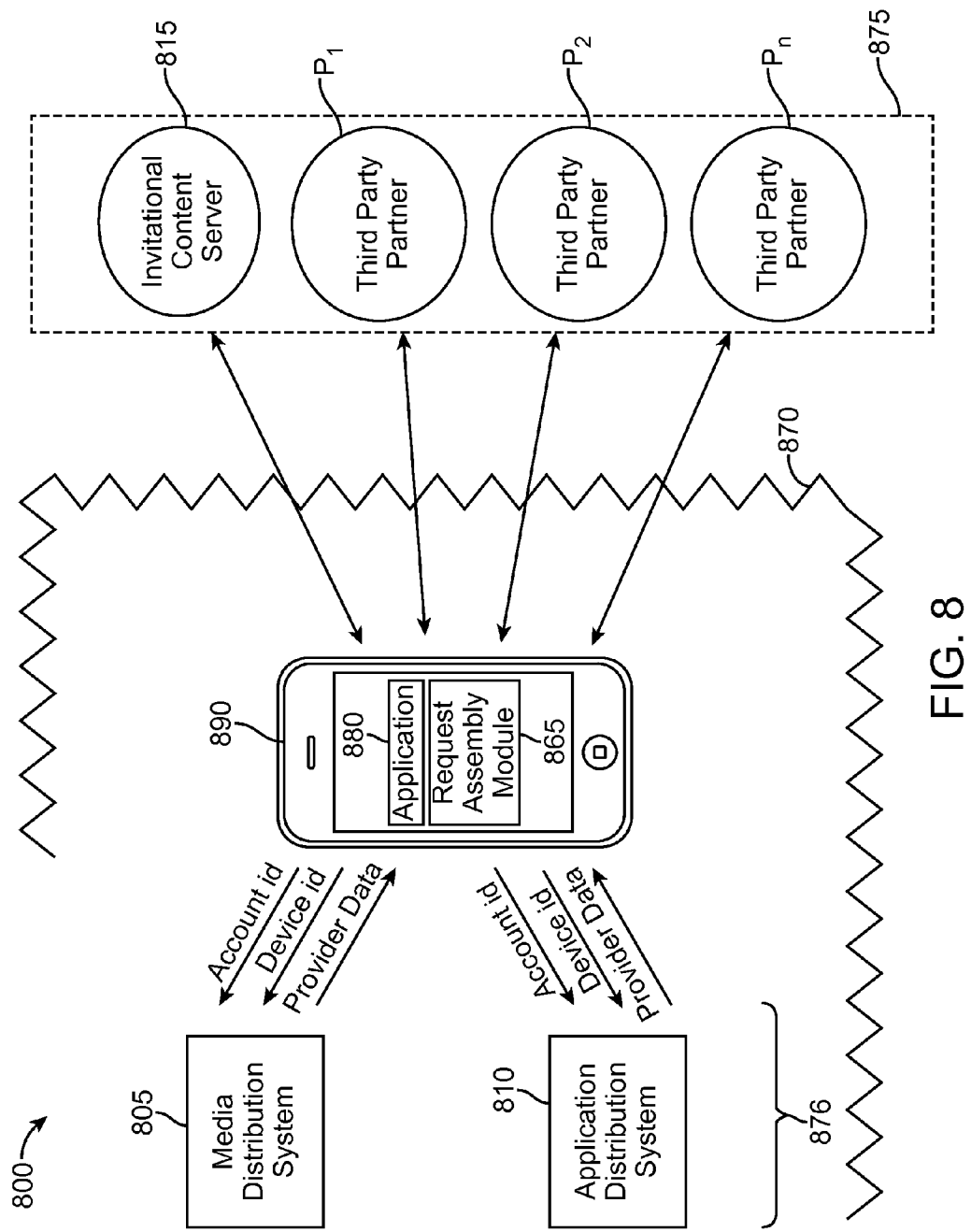
FIG. 8 illustrates a device-centric system for managing identifier values between parts of an ecosystem including online entities having access to a device-specific identifier value and system partners to whom access to the device-specific identifier value is withheld according to some embodiments of the present technology.

FIG. 8 illustrates a device-centric system 800 for managing identifier values between parts of an ecosystem including online entities having access (trusted partners 876 in trusted zone 870) to a device-specific identifier value (identifier value of client device 890) and system partners 875 to whom access to the device-specific identifier value is withheld (i.e., outside the trusted zone 870) according to some embodiments of the present technology. As noted above, it may not be necessary to withhold the identifier value for certain types of operations. Thus, even system partners 875 outside the trusted zone 870 can receive an actual identifier value of the client device 890 under particular circumstances.

In some embodiments of the present technology, an application 880 at client device 890 may wish to access media distribution systems 805 and application distribution systems 810 for the purposes of obtaining content for the application 880, such as purchased content. However, in some cases, the content itself is obtained from third parties outside the trusted zone 870. Thus, the transaction occurs in three steps. First, the application 880 may need to send the user's account identifier value and the pre-defined device identifier value along with the login or purchase request. Second, using that information, the media distribution system 805 or the application distribution system 810 would find and return to the application 880 at the client device 890 content provider data, including a network location of the appropriate system partner providing the content requested and any authorization information needed for enabling access to such content. Finally, the application 880 generates a request for the appropriate system partner using the content provider data.

As shown in FIG. 8, the client device 890 can then be used to enforce a policy that avoids providing device identifier values to system partners 875 outside the trusted zone 870, including invitational content partners 815 or other third party partners P1, P2, . . . , Pn. To enforce this policy, some embodiments of the present technology provide logic within a request assembly module 865 in the client device 890 and that is configured for enforcing the identifier value policies for a particular application for different zones. More specifically, the logic is configured to recognize the difference between requests to entities within the trusted zone and outside the trusted zone. Further, the logic is configured to recognize if an application has been associated with an anonymous identifier value.

Accordingly, in operation, when the request to the media distribution systems 805 or application distribution systems 810 is generated by the application 880, the request assembly module 865 can intercept the request. The request assembly module 865 can first determine whether the entity associated with the request is within the trusted zone. If so, then the request is allowed to proceed either with the pre-defined identifier value for the client device 890 or whatever identifier value has been selected for the trusted zone 870. Once the content provided data is returned to the client device 390, the application 880 can generate a second request based on the content data. Again, the request assembly module 865 can intercept the request. In this case, seeing that the request is associated with an entity outside the zone, the request is adjusted to utilize the anonymous identifier value. This identifier value can be manually selected as described above. Alternatively, the identifier value associated with the application with entities outside the trusted zone 870 is used in the request and forwarded on.

The results of this process are the following. First, the third party partners P1, P2, . . . , Pn the invitational content server 815 do not gain access to the pre-define device identifier value for the client device. Second, the user can change the identifier value for entities outside the trusted zone over time, the client device effectively blocks the ability of system partners 875 in the system 800 to effectively collect information about a particular user. As a result, the user, despite needing to share an identifier value of the client device at times, remains anonymous with respect to certain entities.

The various embodiments described above have been primarily directed at configurations in which the client device 890 awaits for some type of user input to cause a change in the identifier value. However, in some embodiments, no user input may be needed to trigger a change in the identifier value. Rather, in these embodiments, the identifier value may be changed when usage of the identifier value meets certain criteria. For example, as noted above, usage of the identifier value can be used to create notifications for the user, such as the indicia described above with respect to FIG. 7. As noted therein, different indicia can be utilized to indicate different levels of usage of an identifier with respect to all application or individual applications.

In conjunction with the use of such notifications or in alternative to such notifications, a process for automatically altering or changing the identifier value can be provided. In such configurations, criteria can be specified at the client device to trigger such changes. For example, such criteria can include an age of the identifier value, the number of times the identifier has been used (on an overall or per-application basis), the frequency at which the identifier value has been used (on an overall or per-application basis), or some combination thereof (on an overall or per-application basis). As noted above, although the usage level can be a simple measure of usage in some embodiments, in other embodiments the usage level can be based on a formula that translates counts, times, frequency, other measures of usage, or any combinations thereof into a usage level. However, the various embodiments are not limited in this regard and other criteria and combinations thereof can be used as well. Further, such criteria can be pre-defined in the client device, in the software therein, or specified by the user.

In operation, the use of such automatic changes can occur in a manner similar to that described with respect to FIG. 4. That is, at step 402, rather than just monitoring for a user request generated based on user input, the meeting of a criteria is used to generate the user request. Thereafter, the method 400 proceeds in a substantially similar manner.

In some embodiments, this process can be semi-automated. That is, after the criteria are met, the request can be generated to change the identifier value automatically, as described above. However, the user can also be notified regarding the impending change and can be afforded an opportunity to block the change temporarily or permanently. In the case of a temporary change, the user can be re-prompted at a later time. In the case of a permanent change, the client device can include settings to "reset" the process.

As noted above, the automatic changes in identifier values can be used in conjunction with manual controls and notifications, as shown in FIG. 7. In such configurations, at least two levels of usage can be specified. A first, lower level can be used to specify a usage level at which initial notifications are generated, such as those illustrated in FIG. 7. However, achieving such usage levels can be configured to cause no other actions on the client device. A second, higher level can then be used to specify the usage level which action is taken automatically. Thus, the user can still utilize the client device to manually and automatically change the identifier value.

Although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method for executing on a computing device, comprising:

at the computing device having a pre-defined identifier value for a trusted application communicating with a trusted service provider and a current identifier value for a non-trusted application communicating with a non-trusted service provider, generating a request to alter the current identifier value on the computing device used for assembling content requests in response to an activation of at least one user interface element displayed on the computing device;

in response to the generated request, obtaining a new identifier value to replace the current identifier value, the new identifier value selected to be a unique identifier value different than the pre-defined identifier value for the trusted application and different than the current identifier value;

storing, at the computing device, the new identifier value;

intercepting, at the computing device, a request for content from the non-trusted application on the computing device, the intercepted request including the current identifier value;

determine that the request for content is from the non-trusted application; and when the request for content is from the non-trusted application that includes the current identifier value for the non-trusted application, reassembling, at the computing device, the intercepted request to include the new identifier value before passing the reassembled request to the non-trusted service provider.

2. The method of claim 1, wherein the generating comprises:
monitoring for activation of the at least one user interface element in a user interface associated with the computing device;
generating at least one confirmation element in the user interface requesting a confirmation of an instruction to obtain the new identifier value; and
upon confirmation of the instruction, performing the obtaining and the storing of the new identifier value.

3. The method of claim 1, wherein the generating comprises:
monitoring for activation of the at least one user interface element in a user interface associated with the computing device;
when the at least one of the user interface elements is activated, proceeding to the steps of obtaining and storing.

4. The method of claim 1, wherein the request to alter the current identifier value further comprises an identification of at least one of a content provider or an application on the computing device to be associated with the new identifier value.

5. The method of claim 1, wherein the obtaining comprises computing the new identifier value at a time of the request to alter the current identifier value.

6. The method of claim 1, wherein the obtaining comprises selecting the new identifier value from a pre-defined list of identifier values.

7. A communications device, comprising:
a processor;
a display; and
a non-transitory computer-readable medium having stored thereon a plurality of instructions for causing the processor to:
display, on the display, a first user interface element configured to allow selection of the first user interface element to initiate a process to alter a current identifier value associated with a first application on the communications device, and a second user interface element configured to allow selection of the second user interface element to initiate the process to alter a current identifier value associated with a second application;
detect an action on the at least one of the first interface element or the second user interface element;
in response to the detecting the action, obtain a new identifier value for the respective one of the first application or the second application corresponding to the detected action on the at least one of the first user interface element or the second user interface element, the new identifier value being different than the current identifier value and replacing the current identifier value for the respective one of the first application or the second application corresponding to the detected action;
intercept a request for content from an application on the communications device, the request is for content from a service provider; and
determine whether the request is for content from a service provider within a trusted zone;
when the request for content is for content from the service provider within the trusted zone, send the request for content with a pre-defined identifier value of the communications device, the pre-defined identifier value being different than the new identifier value;
when the request for content is for content from the service provider not within the trusted zone that includes the current identifier value for the respective one of the first application or the second application corresponding to the detected action, replace the current identifier value with the new identifier value in the intercepted request, and send the request for content with the new identifier value for the requesting application.

8. The communications device of claim 7, wherein the displaying further comprises:
generating a notification indicating whether a usage of the current identifier value exceeds a maximum usage criterion.

9. The communications device of claim 7, wherein the instructions further cause the processor to:
display on the display a limit tracking user interface element; and
in response to detecting action on the limit tracking user interface element, automatically obtaining the new identifier value upon expiration of each repeating predetermined period.

10. A non-transitory computer-readable medium comprising a plurality of instructions stored thereon for causing a computing device to:
in response to an activation of at least one user interface element displayed on the computing device, generate a request to alter a current identifier value on the computing device used for assembling content requests, the computing device having a predefined identifier value for a trusted application communicating with a trusted service provider and the current identifier value for a non-trusted application communicating with a non-trusted service provider;
in response to the generated request, obtain a new identifier value to replace the current identifier value, the new identifier value selected to be a unique identifier value different than the predefined identifier value for the trusted application and different than the current identifier value;
store the new identifier value;
intercept, at the computing device, a request for content from the non-trusted application on the computing device, the intercepted request including the current identifier value;
determine whether the request for content is from the non-trusted application; and
when the request for content is from the non-trusted application that includes the current identifier value for the non-trusted application, reassemble, at the computing device, the intercepted request to include the new identifier value before passing the reassembled request to the non-trusted service provider.

11. A communications device, comprising:
a processor; and
a non-transitory computer-readable medium, having stored thereon a plurality of instructions for causing the processor to:
detect activation of at least one user interface element resulting in a request to alter a current identifier value for a non-trusted application on a computing device used for assembling content requests originating from the non-trusted application and to a non-trusted service provider and including the current identifier value;
generate a new identifier value for the non-trusted application, the new identifier value selected to be a unique identifier value different than a pre-defined identifier value of the computing device and the current identifier value of the non-trusted application;

store the new identifier value as the current identifier value for the non-trusted application;

intercept, at the computing device, a request for content generated by the non-trusted application on the computing device, the intercepted request including the current identifier value;

determine that the request for content is from the non-trusted application; and when the request for content is for content from a trusted application making a request to a service provider within a trusted zone, send the request for content with the pre-defined identifier value of the computing device, the pre-defined identifier value being different than the new identifier value;

when the request for content is from the non-trusted application that includes the current identifier value for the non-trusted application, reassembling, at the computing device, the intercepted request to include the new identifier value before passing the reassembled request to the non-trusted service provider.

12. The communications device of claim 11, wherein the detecting comprises:

generating at least one confirmation element in the user interface to cause confirmation of an instruction to obtain the new identifier value; and upon confirmation of the instruction, performing the obtaining and the storing of the new identifier value.

13. The communications device of claim 11, wherein the request to alter the current identifier value further comprises an identification of at least one of a content provider or an application on the computing device to be associated with the new identifier value.

14. The communications device of claim 11, wherein the generate the new identifier value comprises computing the new identifier value at a time of the request to alter the current identifier value.

15. The communications device of claim 11, wherein the generate the new identifier value comprises retrieving the new identifier value from a remote computing device.

16. A method for executing on a communications device having a display, the method comprising:

generating a first user interface element on the display configured for allowing a selection of the first user interface element to initiate a process to alter a current identifier value associated with a first application on the communications device, and a second user interface element configured for allowing selection of the second user interface element to initiate the process to alter a current identifier value associated with a second application;

detecting an action on the at least one of the first interface element or the second user interface element;

in response to the detecting action, computing a new identifier value for the respective one of the first application or the second application corresponding to the detected action on the at least one of the first user interface element or the second user interface element, the new identifier value being different than the current identifier value and a pre-defined identifier value of the communications device used in requests for content from a service provider within a trusted zone and replacing the current identifier value for the respective one of the first application or the second application corresponding to the detected action;

intercepting a request for content generated by the respective one of the first application or the second application, the intercepted request including the current identifier value;

when the request for content is for content from a service provider not within the trusted zone that includes the current identifier value for the respective one of the first application or the second application corresponding to the detected action, reassembling the intercepted request to include the new identifier value as the identifier value of the application; and sending the request for content with the new identifier value to the service provider not within the trusted zone.

17. The method of claim 16, wherein the displaying further comprises:

generating a notification indicating whether a usage of the current identifier value exceeds a maximum usage criterion.

18. The method of claim 16, wherein the current identifier value is temporarily replaced.

19. A method for executing on a computing device, comprising:

computing, at the computing device, a usage level for a current identifier value on the computing device used for assembling content requests from a non-trusted application to a service provider outside a trusted zone and including the current identifier value;

determining whether the usage level meets a first usage criteria; and in response to determining that the usage level meets the first usage criteria, performing the steps of:

automatically obtaining a new identifier value for the non-trusted application, the new identifier value selected to be a unique identifier value different than a pre-defined identifier value of the computing device used in requests for content by a trusted application to a service provider within a trusted zone and the current identifier value for the non-trusted application;

storing the new identifier value as the current identifier value for the non-trusted application;

intercepting, at the computing device, a request for content generated by the non-trusted application on the computing device, the intercepted request including the current identifier value; and reassembling, at the computing device, the intercepted request to include the new identifier value before passing the reassembled request to the service provider outside the trusted zone.

20. The method of claim 19, wherein the first usage criteria comprises at least one of an age criteria, a count criteria, or a frequency criteria.

21. The method of claim 19, wherein prior to the obtaining and the storing, the method further comprises:

displaying an interface element at the computing device, the interface element configured to display at the computing device that the current identifier is about to be changed and provide a control element to delay the change.

22. The method of claim 19, further comprising:

determining whether a usage level meets a second usage criteria less than the first usage criteria; and in response to determining that the usage level meets the second usage criteria, generating a notification at the computing device that the usage level is excessive.

* * * * *